United States Patent
Yu et al.

(10) Patent No.: US 11,797,283 B2
(45) Date of Patent: Oct. 24, 2023

(54) APPLICATION PROGRAM DEVELOPMENT AND DEPLOYMENT METHOD AND APPARATUS, AND COMPUTER-READABLE MEDIUM

(71) Applicant: Siemens Aktiengesellschaft, Munich (DE)

(72) Inventors: He Yu, Wuxi (CN); Qi Wang, Wuhan (CN); Wen Jing Zhou, JiangSu (CN); Wei Sun, Wuxi (CN); Hai Tao Zhang, Beijing (CN); Li Wang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/638,478

(22) PCT Filed: Aug. 27, 2019

(86) PCT No.: PCT/CN2019/102904
§ 371 (c)(1),
(2) Date: Feb. 25, 2022

(87) PCT Pub. No.: WO2021/035553
PCT Pub. Date: Mar. 4, 2021

(65) Prior Publication Data
US 2022/0317981 A1    Oct. 6, 2022

(51) Int. Cl.
*G06F 8/60* (2018.01)
*G06F 8/35* (2018.01)
(Continued)

(52) U.S. Cl.
CPC .................. *G06F 8/60* (2013.01); *G06F 8/35* (2013.01); *G06F 8/36* (2013.01); *G06F 8/447* (2013.01);
(Continued)

(58) Field of Classification Search
CPC ........... G06V 20/597; G06F 8/70; G06F 8/65; G06F 8/60; G06F 8/35; G06F 8/36; G06F 8/447; G06F 9/44505; G06F 16/00
See application file for complete search history.

(56) References Cited

U.S. PATENT DOCUMENTS

| | | | |
|---|---|---|---|
| 2007/0201724 A1* | 8/2007 | Steinberg ............. | G06V 20/597 348/E5.042 |
| 2012/0180024 A1 | 7/2012 | Gonzalez ....................... | 717/109 |
| 2013/0232480 A1 | 9/2013 | Winterfeldt et al. ......... | 717/177 |
| 2015/0067642 A1 | 3/2015 | Chen ............................. | 717/121 |

(Continued)

FOREIGN PATENT DOCUMENTS

| | | | | |
|---|---|---|---|---|
| CN | 104423983 | 3/2015 | ............. | G06F 9/445 |
| CN | 105653263 | 6/2016 | ............... | G06F 9/44 |

(Continued)

OTHER PUBLICATIONS

Kim et al, KR20140052769 (translation), May 7, 2014, 13 pgs <KR_20140052769.pdf>.*

(Continued)

*Primary Examiner* — Tuan A Vu
(74) *Attorney, Agent, or Firm* — Slayden Grubert Beard PLLC

(57) ABSTRACT

Various embodiments described herein include an application program development and deployment method comprising: acquiring, from a code template library, a first code template matching a code structure of an application program to be developed; creating a template instance based on the first code template; filling a custom code input by a developer into the template instance to obtain a source program code matching said application program; compiling the source program code to obtain a target program code; acquiring a target operating environment mirror matching the target program code from an environment mirror library, wherein at least one operating environment mirror is stored in the environment mirror library, and different operating environment mirrors correspond to different operating environments; and deploying the target program code and the target operating environment mirror onto a target cloud platform.

9 Claims, 9 Drawing Sheets

(51) Int. Cl.
*G06F 8/36* (2018.01)
*G06F 8/41* (2018.01)
*G06F 9/445* (2018.01)
*G06F 16/00* (2019.01)

(52) U.S. Cl.
CPC .......... *G06F 9/44505* (2013.01); *G06F 16/00* (2019.01)

(56) References Cited

U.S. PATENT DOCUMENTS

2020/0065229 A1* 2/2020 Alexander ................ G06F 8/70
2020/0394120 A1* 12/2020 Fathi Salmi .............. G06F 8/65

FOREIGN PATENT DOCUMENTS

| CN | 107133044 | 9/2017 | ............... G06F 9/44 |
| CN | 109814881 | 5/2019 | ............... G06F 8/61 |

OTHER PUBLICATIONS

Liu et al, CN 109189750 (translation), May 31, 2019, 41 pgs <CN_109189750.pdf>.*
Jing et al, CN 109783374, (translation), May 21, 2019, 12pgs <CN_109783374.pdf>.*
Xu et al, CN 106936636, (translation), Jul. 7, 2017, 11 pgs < CN_106936636.pdf>.*
Liu Wei, CN 104468458, (translation) Sep. 11, 2018, 11 pgs < CN_104468458.pdf>.*
Bao et al, CN 106020930, (translation), Jul. 23, 2019, 28 pgs < CN_106020930.pdf>.*
Search Report for International Application No. PCT/CN2019/102904, 14 pages, dated Jun. 1, 2020.
Extended European Search Report, Application No. 19942914.3, 10 pages, dated Mar. 14, 2013.

* cited by examiner

APPLICATION PROGRAM DEVELOPMENT AND DEPLOYMENT METHOD AND APPARATUS, AND COMPUTER-READABLE MEDIUM

CROSS-REFERENCE TO RELATED APPLICATIONS

This application is a U.S. National Stage Application of International Application No. PCT/CN2019/102904 filed Aug. 27, 2019, which designates the United States of America, the contents of which are hereby incorporated by reference in their entirety.

TECHNICAL FIELD

The present disclosure relates to the field of computer technology. Various embodiments of the teachings herein may include application program development and deployment methods and apparatuses, and/or a computer-readable medium for the same.

BACKGROUND

With the continued development and improvement of computer technology and cloud technology, various types of application programs may be deployed onto a cloud platform, and application programs deployed on a cloud platform may be used to perform operations such as data transmission, data processing, and issuance of a control instruction, thereby providing closed-loop services in the industrial field. Deploying an application program onto a cloud platform usually requires completion of two phases: application program development and application program deployment.

Currently, the application program development phase and the application program deployment phase are separate, wherein, first, code development of an application program is completed in the application program development phase, and then the developed application program is deployed onto a cloud platform in the application program deployment phase.

With a conventional method of application program development and deployment, since the application program development phase and the application program deployment phase are gone through separately, if different developers use different development environments to develop application program code in the application program development phase, there will be a mismatch between a development environment and an operating environment in the application program deployment phase, and thus the developed application program code needs to be modified, which makes application program development and deployment inefficient.

SUMMARY

In view of the above-described background, an application program development and deployment method and apparatus, and a computer-readable medium provided by the teachings of the present disclosure can improve the efficiency of application program development and deployment. For example, a first embodiment provides an application program development and deployment method, comprising: acquiring, from a code template library, a first code template matching a code structure of an application program to be developed, wherein at least one code template is stored in the code template library, and different code templates have different code structures; creating a template instance according to the first code template; filling a custom code inputted by a developer into the template instance, to obtain a source program code matching said application program; compiling the source program code to obtain a target program code; acquiring a target operating environment mirror matching the target program code from an environment mirror library, wherein at least one operating environment mirror is stored in the environment mirror library, and different operating environment mirrors correspond to different operating environments; and deploying the target program code and the target operating environment mirror onto a target cloud platform.

In some embodiments, before said acquiring a first code template matching an application program to be developed, the method further comprises: acquiring a second code template selected by the developer; identifying the structure of the second code template to determine at least one project node included in the second code template, attributes of each of the project nodes, and node relationships among the different project nodes, wherein the project node is the basic unit that composes an application program code; judging whether the number of the project nodes, the attributes of the project nodes and the node relationships all match a code structure of the application program to be developed; if the number of the project nodes, the attributes of the project nodes, and the node relationships all match a code structure of the application program to be developed, determining the second code template as the first code template, and storing the first code template in the code template library; and if any of the number of the project nodes, the attributes of the project nodes, and the node relationships fails to match a code structure of the application program to be developed, updating the structure of the second code template according to a template setting instruction from the developer, determining the second code template subjected to the structure update as the first code template, and storing the first code template in the code template library.

In some embodiments, before storing the first code template in the code template library, the method further comprises: for any of the project nodes included in the first code template, adding at least one code segment matching the project node to the first code template, wherein the code segment comprises the program code of at least one code character, and, after the code segment is filled into the matched project node, the project node may be caused to fulfill the corresponding function; correspondingly, said filling a custom code inputted by a developer into the template instance comprises: for any of the instantiated project nodes in the template instance, selecting, according to a code segment selection instruction from the developer, at least one of the code segments that match the project node and then filling it into the project node.

In some embodiments, before storing the first code template in the code template library, the method further comprises, for each of the project nodes included in the first code template, adding a prompt message matching the project node in the first code template, wherein the prompt message is used to show at least one of a rule, a method, and precautions for filling the custom code into the matched project node.

In some embodiments, deploying the target program code and the target operating environment mirror onto a target cloud platform comprises: selecting the target cloud platform from at least one optional cloud platform; sending a performance detection signal to the target cloud platform, wherein the performance detection signal is used to cause the target cloud platform to return a resource response message used for characterizing the computing performance of the target cloud platform; receiving the resource response message from the target cloud platform; generating a deployment configuration file according to the resource response message, wherein the deployment configuration file comprises random access memory storage space and hard disk storage space required for the target program code to run; and sending the target program code, the target operating environment mirror, and the deployment configuration file to the target cloud platform, so that the cloud platform deploys the target program code and the target operating environment mirror according to the deployment configuration file.

In some embodiments, an application program development and deployment apparatus comprises: a template acquiring module configured to acquire, from a code template library, a first code template matching a code structure of an application program to be developed, wherein at least one code template is stored in the code template library, and different code templates have different code structures; an instance creating module configured to create a template instance according to the first code template acquired by the template acquiring module; a code filling module configured to fill a custom code inputted by a developer into the template instance created by the instance creating module, to obtain a source program code matching said application program; a code compiling module configured to compile the source program code acquired by the code filling module, to obtain a target program code; an environment acquiring module configured to acquire, from an environment mirror library, a target operating environment mirror matching the target program code acquired by the code compiling module, wherein at least one operating environment mirror is stored in the environment mirror library, and different operating environment mirrors correspond to different operating environments; and a program deploying module configured to deploy the target program code acquired by the code compiling module and the target operating environment mirror acquired by the environment acquiring module onto a target cloud platform.

In some embodiments, the application program development and deployment apparatus further comprises: a structure identifying module configured to obtain a second code template selected by the developer, and identify the structure of the second code template to determine at least one project node included in the second code template, attributes of each of the project nodes, and node relationships among the different project nodes, wherein the project node is the basic unit that composes an application program code; a template matching module configured to judge whether the number of the project nodes, the attributes of the project nodes and the node relationships determined by the structure identifying module all match a code structure of the application program to be developed; a template generating module configured to, when the template matching module determines that the number of the project nodes, the attributes of the project nodes and the node relationships all match a code structure of the application program to be developed, determine the second code template as the first code template and store the first code template in the code template library, and, when the template matching module determines that any of the number of the project nodes, the attributes of the project nodes, and the node relationships fails to match a code structure of the application program to be developed, update the structure of the second code template according to a template setting instruction from the developer, determine the second code template subjected to the structure update as the first code template, and store the first code template in the code template library.

In some embodiments, the application program development and deployment apparatus further comprises: a code segment adding module; the code segment adding module is configured to, before the template generating module stores the first code template in the code template library, for any of the project nodes included in the first code template, add at least one code segment matching the project node to the first code template, wherein the code segment is a program code containing at least one code character, and, after the code segment is filled into the matched project node, the project node may be caused to fulfill the corresponding function; the code filling module is configured to, for any of the instantiated project nodes in the template instance, select, according to a code segment selection instruction from the developer, at least one of the code segments added by the code segment adding module that match the project node and then fill it into the project node.

In some embodiments, the application program development and deployment apparatus further comprises: a prompt message adding module; the prompt message adding module is configured to, for each of the project nodes included in the first code template, before the template generating module stores the first code template in the code template library, add a prompt message matching the project node in the first code template, wherein the prompt message is used to show at least one of a rule, a method, and precautions for filling the custom code into the matched project node.

In some embodiments, the program deploying module comprises: a cloud platform selecting unit configured to select the target cloud platform from at least one optional cloud platform; a signal sending unit configured to send a performance detection signal to the target cloud platform selected by the cloud platform selecting unit, wherein the performance detection signal is used to cause the target cloud platform to return a resource response message used for characterizing the computing performance of the target cloud platform; a message receiving unit configured to receive the resource response message returned by the target cloud platform according to the performance detection signal sent by the signal sending unit; a file generating unit configured to generate a deployment configuration file according to the resource response message received by the message receiving unit, wherein the deployment configuration file comprises random access memory storage space and hard disk storage space required for the target program code to run; and a file sending unit configured to send the target program code, the target operating environment mirror, and the deployment configuration file generated by the file generating unit to the target cloud platform, so that the cloud platform deploys the target program code and the target operating environment mirror according to the deployment configuration file.

In some embodiments, an application program development and deployment apparatus comprises: at least one memory and at least one processor; the at least one memory being configured to store a machine-readable program; the at least one processor is configured to invoke the machine-readable program to implement the method provided by the first aspect and any possible implementation manner of the first aspect.

In some embodiments, there is a computer-readable medium on which a computer instruction is stored, and the computer instruction, when executed by a processor, causes the processor to implement the methods described herein and any possible implementation manner.

The above-described technical solutions show that when an application program is to be developed and deployed onto a cloud platform, first, a first code template matching a code structure of the application program to be developed is acquired from a code template library and a template instance is created according to the first code module, then a custom code inputted by a developer is filled into the template instance to obtain a source program code matching the application program and the source program code is compiled to obtain a target program code, then a target operating environment mirror matching the target program code is acquired from an environment mirror library, and then the target program code and the target operating environment mirror may be deployed onto a target cloud platform.

It is thus clear that at development and deployment nodes of an application program, a developer only needs to select a code template and fill a custom code into the required code template, while other steps may be completed automatically, wherein, since the developer does not need to manually select a development environment, there will be no mismatch between a development environment and an operating environment, and thus the efficiency of application program development and deployment is improved.

DETAILED DESCRIPTION

As mentioned above, during application program development and deployment according to the prior art, since the application program development phase and the application program deployment phase are separate, if different developers use different development environments to develop application program code in the application program development phase, there may be a mismatch between a development environment and an operating environment in the application program deployment stage, in which case it is necessary to modify part of the developed application program code, and since modifying the application program code takes extra time, the total time of application program development and deployment increases, and thus the application program development and deployment is inefficient.

In some embodiments of the teachings herein, a plurality of code templates with different code structures are stored in a code template library, and a plurality of operating environment mirrors with different operating environments are stored in an environment mirror library, wherein, during development and deployment of an application program to be developed, first, a first code template matching a code structure of the application program is selected from a code template library, after a template instance is created according to the first code template, a custom code inputted by a developer is filled into the template instance to obtain a source program code matching the application program and the source program code may be compiled to obtain a target program code, then a target operating environment mirror matching the target program code may be acquired from an environment mirror library, and then the target program code and the target operating environment mirror may be deployed onto a target cloud platform.

Since a developer, after selecting a code template, may complete the development of application program code by simply adding a custom code to the selected code template, regardless of the development environment of the developed application program during the period, after the developed source program code is compiled into a target program code, a target operating environment mirror matching the target program code is acquired from an environment mirror library, and then the target program code and the target operating environment mirror may be deployed onto a cloud platform, wherein, since there will be no mismatch between a development environment and an operating environment, no modification of application program code due to a mismatch between a development environment and a deployment environment is needed, and thus the efficiency of application program development and deployment may be improved.

An application program development and deployment method and apparatus provided by embodiments of the present invention will be described in detail below with reference to the drawings.

Figure 1:
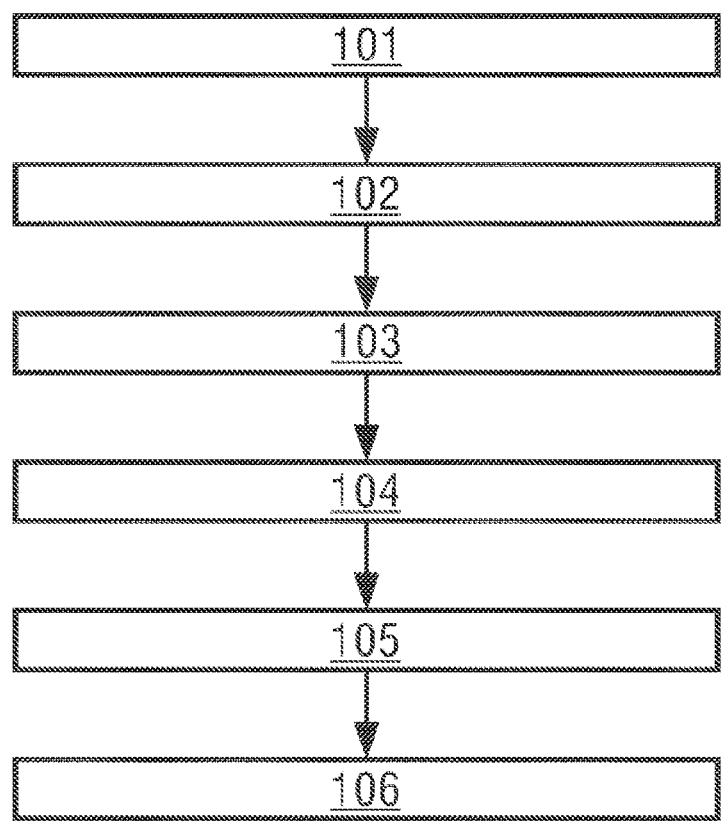
FIG. 1 is a flowchart of an application program development and deployment method incorporating teachings of the present disclosure.

As shown in FIG. 1, some embodiments of teachings of the present disclosure include an application program development and deployment method comprising:

step 101: acquiring, from a code template library, a first code template matching a code structure of an application program to be developed, wherein at least one code template is stored in the code template library, and different code templates have different code structures;

step 102: creating a template instance according to the first code template;

step 103: filling a custom code inputted by a developer into the template instance, to obtain a source program code matching said application program;

step 104: compiling the source program code to obtain a target program code;

step 105: acquiring a target operating environment mirror matching the target program code from an environment mirror library, wherein at least one operating environment mirror is stored in the environment mirror library, and different operating environment mirrors correspond to different operating environments; and step 106: deploying the target program code and the target operating environment mirror onto a target cloud platform.

In some embodiments, when an application program is to be developed and deployed onto a cloud platform, first, a first code template matching a code structure of the application program to be developed is acquired from a code template library and a template instance is created according to the first code module, then a custom code inputted by a developer is filled into the template instance to obtain a source program code matching the application program and the source program code is compiled to obtain a target program code, then a target operating environment mirror matching the target program code is acquired from an environment mirror library, and then the target program code and the target operating environment mirror may be deployed onto a target cloud platform. It is thus clear that at development and deployment nodes of an application program, a developer only needs to select a code template and fill a custom code into the required code template, while other steps may be completed automatically, wherein, since the developer does not need to manually select a development environment, there will be no mismatch between a development environment and an operating environment, and thus the efficiency of application program development and deployment is improved.

In some embodiments, a code template library is configured to store code templates with different code structures, and various containers that can store code templates may be used as code template libraries, wherein a code template library may be application container engine software stacks (Docker software stacks), for example. In addition, an environment mirror library is used to store operating environment mirrors corresponding to different operating environments, and various containers that can store operating environment mirrors may be used as environment mirror libraries, wherein an environment mirror library may also be application container engine software stacks (Docker software stacks), for example.

In some embodiments, application container engine software stacks (Docker software stacks) may be used as a code template library and an environment mirror library, so that the development and deployment of an application program may be combined to form a closed-loop service for the development and deployment of the application program, which makes it convenient to develop and deploy application programs, and to manage code templates and operating environment mirror templates. In addition, on the basis of the high scalability of Docker, it is possible to store operating environment mirrors in Docker that support different languages, such as Java and Python, so that is applicable for application programs developed in different languages, and it is also possible to add operating environment mirrors to Docker, which ensures the applicability of the application program development and deployment method.

In some embodiments, on the basis of the application program development and deployment method shown in FIG. 1, before selecting, from a code template library, a first code template matching a code structure of an application program to be developed, it is necessary to generate a first code template matching a code structure of the application program to be developed, and store the generated first code template in a code template library.

Figure 2:
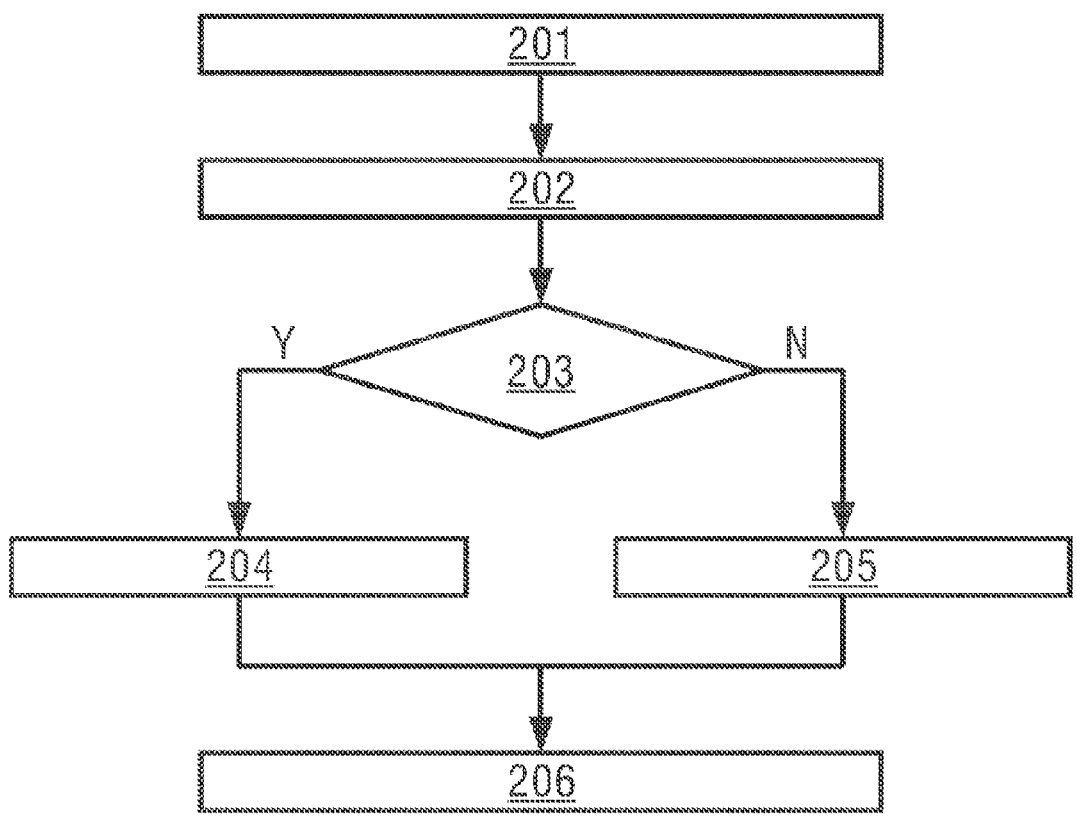
FIG. 2 is a flowchart of a method for generating and storing a first code target incorporating teachings of the present disclosure.

As shown in FIG. 2, generation and storage of the first code template may be implemented by performing:

step 201: acquiring a second code template selected by a developer;

step 202: identifying the structure of the second code template to determine at least one project node included in the second code template, attributes of each of the project nodes, and node relationships among the different project nodes, wherein the project node is the basic unit that composes an application program code;

step 203: judging whether the number of the project nodes, the attributes of the project nodes and the node relationships all match a code structure of the application program to be developed, going to step 204 if the result is yes (Y), and going to step 205 if the result is no (N);

step 204: determining the second code template as the first code template, and going to step 206;

step 205: updating the structure of the second code template according to a template setting instruction from a developer, and determining the second code template subjected to the structure update as the first code template; and step 206: storing the first code template in a code template library.

In some embodiments, before application program development and deployment, an experienced developer selects a second code template according to a code structure of an application program to be developed, so that the selected second code template is a good match for a code structure of the application program to be developed, so that a first code template is generated on the basis of the second code template.

In some embodiments, a second code template may be a script file or an architecture project. For example, a second code template may be a script file written by an experienced developer, and a certain code structure, such as a plurality of project nodes defined and sub-nodes included in each project node, is formed in the script file. Another example is that a second code template may be an architecture project that has been constructed and in which a plurality of functional modules are added, wherein different functional modules need to be implemented by different codes, and thus a relationship between functional modules defines a code structure.

In some embodiments, a second code template is sourced from a local storage space or an external storage space. When a second code template is sourced from a local storage space, the second code template may be acquired according to an internal address designated by a developer, and internal addresses mainly include a folder path and a file path address. When a second code template is sourced from an external storage space, the second code template may be acquired according to an external address designated by a developer, and external addresses mainly include a Uniform Resource Locator (URL) and a distributed version control system (Git).

In some embodiments, after a second code template is acquired, the structure of the second code template may be identified to determine the project nodes included in the second code template, attributes of each project node, and node relationships among the different project nodes. The project node is the basic unit that composes an application program, wherein each project node can fulfill some functions of the application program through the corresponding code, and all the functions of the application program may be fulfilled by mutual reference between project nodes. Attributes of a project node include a language corresponding to the project node and the number of characters that may be contained. A relationship between project nodes characterizes a relationship between different project nodes in terms of mutual reference and influence. In addition, by identifying the structure of the second code template, it is also possible to retrieve information such as the folder name, folder path, file name, file path in the folder, and file attributes of the second code template.

In some embodiments, after determining the project nodes included in the second code template, attributes of each project node, and node relationships among different project nodes, it is possible to judge whether the determined project nodes, attributes of the project nodes, and node relationships among the project nodes all match a code structure of the application program to be developed. If the determined project nodes, attributes of the project nodes, and node relationships among the project nodes match a code structure of the application program to be developed, it indicates that the application program may be developed simply on the basis of a second code template, and thus the second code template is directly determined as the first code template. If the determined project nodes, attributes of the project nodes, and node relationships among the project nodes do not completely match a code structure of the application program to be developed, it indicates that there is a difference between the second code template and a code structure of the application program to be developed, and thus a developer can update the structure of the second code template, so that the project nodes included in the updated second code template, attributes of the project nodes, and node relationships among the project nodes completely match a code structure of the application program to be developed, and then the updated second code template is determined as the first code template.

In some embodiments, updating a second code template mainly comprises adding a project node, changing an attribute of a project node, and changing a node relationship between project nodes.

In some embodiments, by identifying the structure of the second code template, if the number of project nodes included in the second code, attributes of the project nodes, and node relationships all match a code structure of the application program to be developed, then the second code template is directly determined as the first code template, and, if the number of project nodes included in the second code, attributes of the project nodes, and node relationships do not completely match a code structure of the application program to be developed, then the second code template is updated, so that the number of project nodes included in the updated second code template, attributes of the project nodes, and node relationships all match a code structure of the application program to be developed, and then the updated second code template is determined as the first code template, which ensures that the determined first code template matches a code structure of the application program to be developed, so that subsequent developers may, simply by filling a custom code into an template instance, complete the development of the application program, without the need to modify the overall framework of the first code template, thereby ensuring that subsequent development work is done smoothly.

In some embodiments, a first code template is usually developed by an experienced developer, wherein, specifically, the developer generates a first code template according to the overall architecture of an application program to be developed and, after the first code template is generated, a plurality of developers may fill custom codes into a template instance to complete the development of the application program. Since, during the subsequent development of the application program, a developer only needs to write or directly acquire a custom code, and fill the custom code into the corresponding part of a template instance, the requirements on developers are relatively low, and thus in the application program development process, only the generation of a first code template imposes strict requirements on developers, while the subsequent development process has relatively low requirements on developers, which can reduce the personnel cost of application program development.

In some embodiments, on the basis of the method for generating and storing a first code template shown in FIG. 2, before the first code template is stored in a code template library, an optional code segment may be added to the first code template as an optional custom code available to a developer. Specifically, for any project node included in the first code template, one or more code segments matching the project node may be added to the first code template, wherein a code segment is a program code that contains at least one code character, and, after the code segment is filled into the matched project node, the project node may be caused to fulfill the corresponding function.

Correspondingly, when a custom code inputted by a developer is filled into a template instance in step 103, for any instantiated project node in the template instance, after a code segment selection instruction is received from a developer, according to the code segment selection instruction, one or more code segments matching the project node may be selected from the first code template and filled into the project node.

In some embodiments, for any project node in the first code template, one or more code segments that have been written and may be used are added to the first code template as node segments matching the project node and, when a developer fills a custom code into the project node, the developer can select one or more of the code segments that match the project node and fill it into the project node, thereby completing the task of filling custom codes into the project node. By adding a code segment in the first code template, when a code segment matching a project node contains the custom code that needs to be filled into the project node, a developer can directly select the corresponding code segment and fill it into the project node, without the need of writing a custom code manually, which improves the code reuse rate, while further increasing the efficiency of application program development.

In some embodiments, since the first code template may contain a plurality of project nodes, code segments may be added separately for all the project nodes in the first code template, or may be added only for some project nodes in the first code template. In addition, for a project node to which a code segment is added, when a developer triggers the project node, information on all the code segments matching the project node may be displayed to the developer, which makes it convenient for the developer to make a selection, and if the required code segment is not included in any of the code segments matching the project node, the developer can still manually add a custom code to the project node.

In some embodiments, on the basis of the method for generating and storing the first code template shown in FIG. 2, before the first code template is stored in a code template library, a prompt message may be added to the first code template, so as to guide the developer through the process of filling a custom code into a template instance. Specifically, for any project node included in the first code template, a prompt message matching the project node may be added to the first code template, wherein the prompt message is used to show at least one of a rule, a method, and precautions for filling a custom code into the project node.

In some embodiments, for any project node in the first code template, a prompt message used for showing a rule, a method, and precautions for filling a custom code into the project node is added to the first code template as a prompt message matching the project node. Correspondingly, when a developer triggers a project node to add a custom code to the project node, a prompt message matching the project node may be displayed to the developer, showing the developer a rule, a method, and precautions for filling a custom code into the project node, so that the developer properly adds a custom code to the project node according to the prompt message, which further improves the efficiency of application program development.

In some embodiments, prompt messages for different project nodes are added to the first code template, and when a developer fills a custom code into a project node, the prompt message matching the project node may be displayed to the developer, showing the developer a rule, a method, and precautions for filling a custom code into the project node, so that the developer can fill a custom code into the project node according to the prompt message. Since the prompt message explains a rule, a method, and precautions for filling a custom code into the project node, the developer only needs to fill a custom code into the project node according to the prompt message, which can relax skill requirements on developers in the application program development process.

In some embodiments, since the first code template may contain a plurality of project nodes, prompt messages may be added separately for all the project nodes in the first code template, or may be added only for some project nodes in the first code template. In addition, for a project node to which a matching prompt message is added, when a developer triggers the project node to start filling a custom code into the project node, the prompt message matching the project node may be automatically displayed to, before the developer starts filling in a custom code, give the developer the corresponding hint on filling in a code.

In some embodiments, on the basis of the application program development and deployment method shown in FIG. 1, when a target program code and a target operating environment mirror are deployed onto a target cloud platform in step 106, running resources required for deploying the target program code may be determined on the basis of the computing performance of the target cloud platform, and then a corresponding deployment configuration file is generated to deploy the target program code according to the required running resources.

Figure 3:
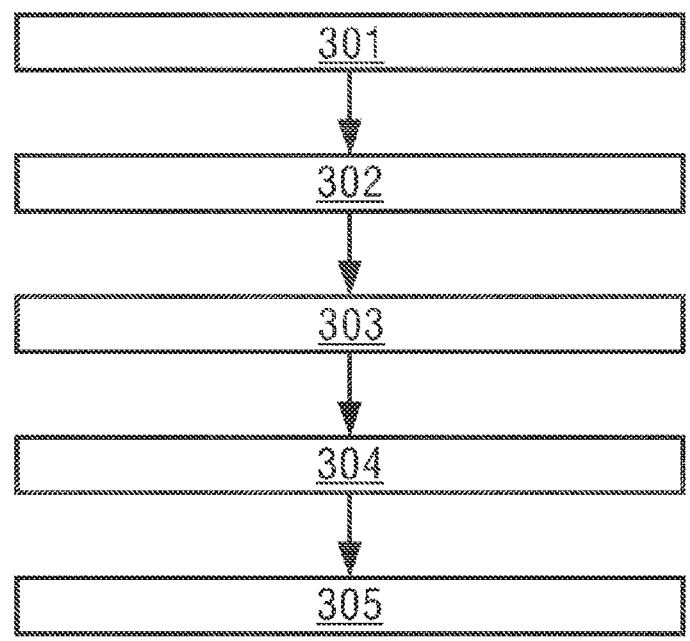
FIG. 3 is a flowchart of an application program deployment method incorporating teachings of the present disclosure.

As shown in FIG. 3, deployment of a target program code and a target operating environment mirror onto a target cloud platform may be implemented by performing:
step 301: selecting a target cloud platform from at least one optional cloud platform;
step 302: sending a performance detection signal to the target cloud platform, wherein the performance detection signal is used to cause the target cloud platform to return a resource response message used for characterizing the computing performance of the target cloud platform;
step 303: receiving a resource response message from the target cloud platform;
step 304: generating a deployment configuration file according to the resource response message, wherein the deployment configuration file comprises random access memory storage space and hard disk storage space required for the target program code to run; and
step 305: sending the target program code, the target operating environment mirror, and the deployment configuration file to the target cloud platform, so that the cloud platform deploys the target program code and the target operating environment mirror according to the deployment configuration file.

In some embodiments, before deploying a target program code and a target operating environment mirror onto a target cloud platform, the computing performance of the target cloud platform may be detected, the random-access memory (RAM) storage space and hard disk storage space required to deploy the target program code to the target the cloud platform may be determined according to the detected computing performance, then the determined random-access memory storage space and hard disk storage space may be recorded in a deployment configuration file, and then the target program code, the target operating environment mirror, and the deployment configuration file are sent to the target cloud platform, so that the target cloud platform allocates the corresponding RAM storage space and hard disk storage space for the target program code according to the deployment configuration file, and completes the deployment of the target program code and the target operating environment mirror. Since the RAM storage space and hard disk storage space required for the target program code to run is determined according to the computing performance of the target cloud platform, and then the target level code and target operating environment mirror are deployed onto the target cloud platform according to the determined RAM storage space and hard disk storage space, this, on the one hand, ensures that the target program code runs properly after being deployed onto the target cloud platform, so as to secure a high success rate of application program deployment, and on the other hand, eliminates the need to manually set the running resources required to deploy the target program code, thereby reducing developer workload during application program deployment.

In some embodiments, a plurality of optional cloud platforms are preset, and optional cloud platforms may include AWS (Amazons' cloud operating system), Azure (Microsoft's cloud operating system), Alibaba (Alibaba's cloud operating system), and MindSphere (Siemens's cloud operating system), for example. By preferably setting a plurality of optional cloud platforms, users can deploy target program codes onto corresponding cloud platforms according to their needs, so that individual needs of different users are met and the applicability of the application program development and deployment method is ensured.

In some embodiments, in order to allow the deployment of application programs onto different cloud platforms, command-line interfaces (CLIs) of different cloud platforms may be integrated so that deployment target paths are generated through the CLIs. In addition, a deployment configuration file may also be generated on the basis of a CLI.

In some embodiments, before sending a target program code, a target operating environment mirror, and a deployment configuration file to a target cloud platform, a digital signature may be added to the target program code, the target operating environment mirror, and the deployment configuration file, and the cloud platform, after receiving the target program code, the target operating environment mirror, and the deployment configuration file, checks the digital signature, and if the signature is verified, deploys the target program code and the target operating environment mirror, thus ensuring the security of the application program deployment process.

In some embodiments, information on a target program code and a target operating environment mirror may be stored in a blockchain, and after the target program code and the target operating environment mirror are sent to a target cloud platform, the target cloud platform may, on the basis of the information stored in the blockchain, verify the integrity of the target program code and the target operating environment mirror, thereby ensuring the security of the code and team collaboration.

It should be noted that, in the application program development and deployment methods provided in the above-described embodiments, source program code refers to program code written in a corresponding development language, for example, program code written in C, C++, C language, Java, VB, or Python. Meanwhile, in the application program development and deployment methods provided by the above-described embodiments, target program code refers to machine-identifiable program code acquired by compiling a source program code, which means that target program code mainly refers to binary code.

Figure 4:
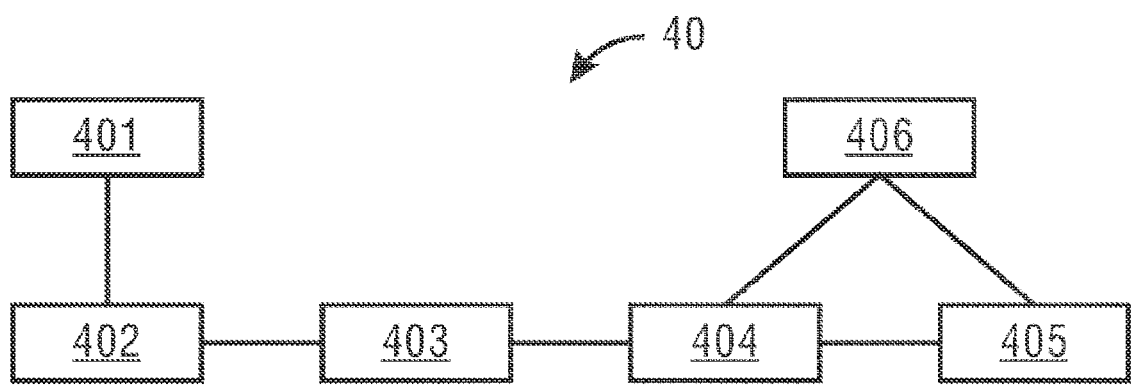
FIG. 4 is a schematic diagram of an application program development and deployment apparatus incorporating teachings of the present disclosure.

As shown in FIG. 4, an embodiment incorporating teachings of the present disclosure includes an application program development and deployment apparatus 40, comprising:

a template acquiring module 401 configured to acquire, from a code template library, a first code template matching a code structure of an application program to be developed, wherein at least one code template is stored in the code template library, and different code templates have different code structures;

an instance creating module 402 configured to create a template instance according to the first code template acquired by the template acquiring module 401;

a code filling module 403 configured to fill a custom code inputted by a developer into the template instance created by the instance creating module 402, to obtain a source program code matching said application program;

a code compiling module 404 configured to compile the source program code acquired by the code filling module 403, to obtain a target program code;

an environment acquiring module 405 configured to acquire, from an environment mirror library, a target operating environment mirror matching the target program code acquired by the code compiling module 404, wherein at least one operating environment mirror is stored in the environment mirror library, and different operating environment mirrors correspond to different operating environments; and a program deploying module 406 configured to deploy the target program code acquired by the code compiling module 404 and the target operating environment mirror acquired by the environment acquiring module 405 onto a target cloud platform.

In some embodiments, the template acquiring module 401 may be configured to execute step 101 in the above-described method embodiments, the instance creating module 402 may be configured to execute step 102 in the above-described method embodiments, the code filling module 403 may be configured to execute step 103 in the above-described method embodiments, the code compiling module 404 may be configured to execute step 104 in the above-described method embodiments, the environment acquiring module 405 may be configured to execute step 105 in the above-described method embodiments, and the program deploying module 406 may be configured to execute step 106 in the above-described method embodiments.

Figure 5:
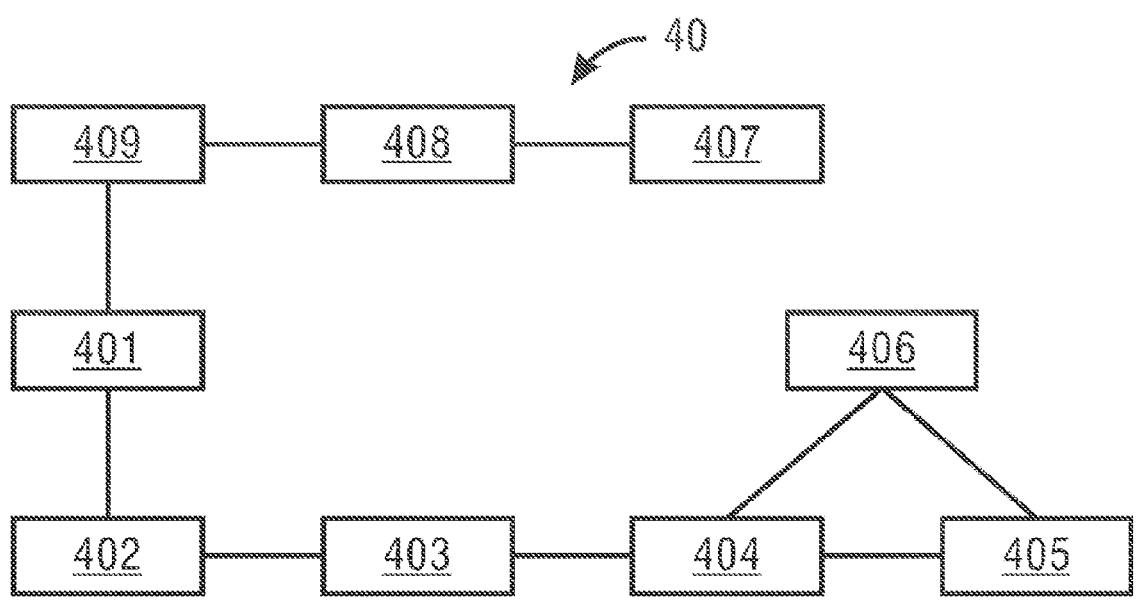
FIG. 5 is a schematic diagram of another application program development and deployment apparatus incorporating teachings of the present disclosure.

In some embodiments, on the basis of the application program development and deployment apparatus 40 shown in FIG. 4, as shown in FIG. 5, the application program development and deployment apparatus 40 further comprises:

a structure identifying module 407 configured to obtain a second code template selected by a developer, and identify the structure of the second code template to determine at least one project node included in the second code template, attributes of each of the project nodes, and node relationships among the different project nodes, wherein the project node is the basic unit that composes an application program code;

a template matching module 408 configured to judge whether the number of the project nodes, the attributes of the project nodes and the node relationships determined by the structure identifying module 407 all match a code structure of the application program to be developed; and a template generating module 409 configured to, when the template matching module 408 determines that the number of the project nodes, the attributes of the project nodes and the node relationships all match a code structure of the application program to be developed, determine the second code template as the first code template and store the first code template in the code template library, and, when the template matching module 408 determines that any of the number of the project nodes, the attributes of the project nodes, and the node relationships fails to match a code structure of the application program to be developed, update the structure of the second code template according to a template setting instruction from the developer, determine the second code template subjected to the structure update as the first code template, and store the first code template in the code template library.

Figure 6:
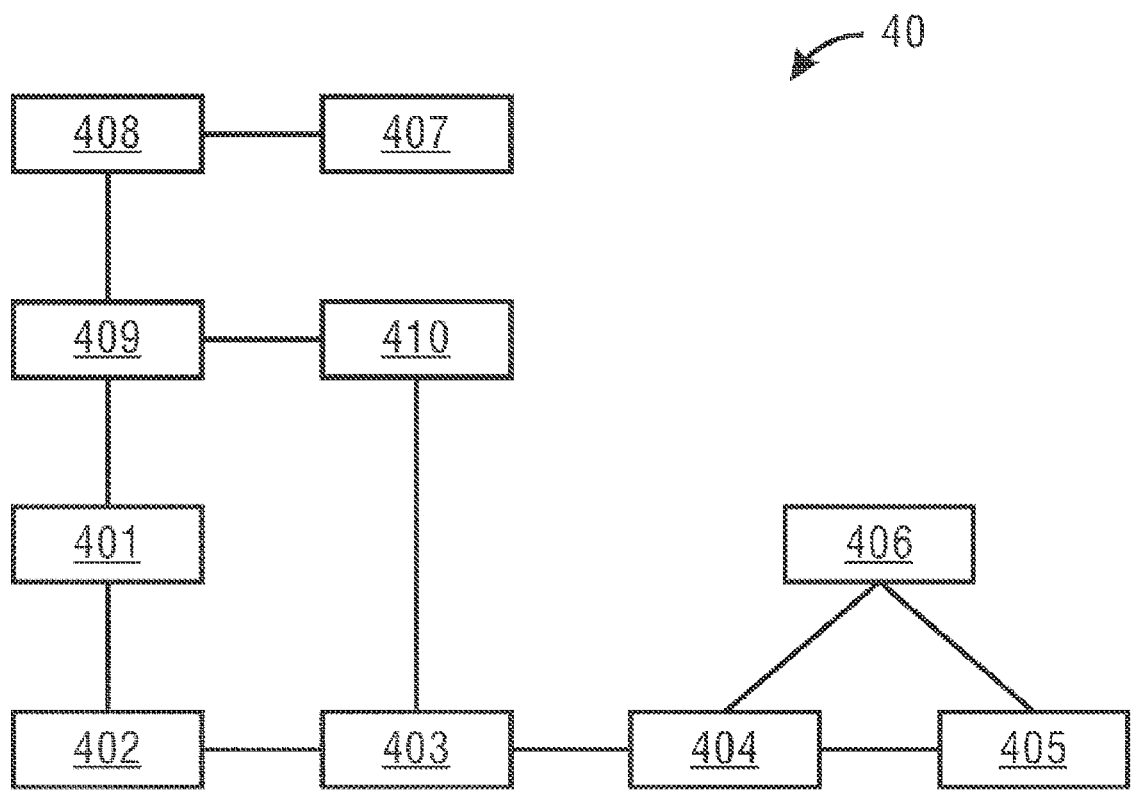
FIG. 6 is a schematic diagram of an application program development and deployment apparatus comprising a code segment adding module incorporating teachings of the present disclosure.

In some embodiments, the structure identifying module 407 may be configured to perform steps 201 and 202 in the above-described method embodiments, the template matching module 408 may be configured to execute step 203 in the above-described method embodiments, and the template generating module 409 may be configured to execute steps 204 to 206 in the above-described method embodiments. In some embodiments, on the basis of the application program development and deployment apparatus 40 shown in FIG. 5, as shown in FIG. 6, the application program development and deployment apparatus 40 further comprises:

a code segment adding module 410;

the code segment adding module 410 is configured to, before the template generating module 409 stores the first code template in the code template library, for any of the project nodes included in the first code template, add at least one code segment matching the project node to the first code template, wherein the code segment is a program code containing at least one code character, and, after the code segment is filled into the matched project node, the project node may be caused to fulfill the corresponding function;

a code filling module 403 configured to, for any of the instantiated project nodes in the template instance, select, according to a code segment selection instruction from the developer, at least one of the code segments added by the code segment adding module 410 that match the project node and then fill it into the project node.

Figure 7:
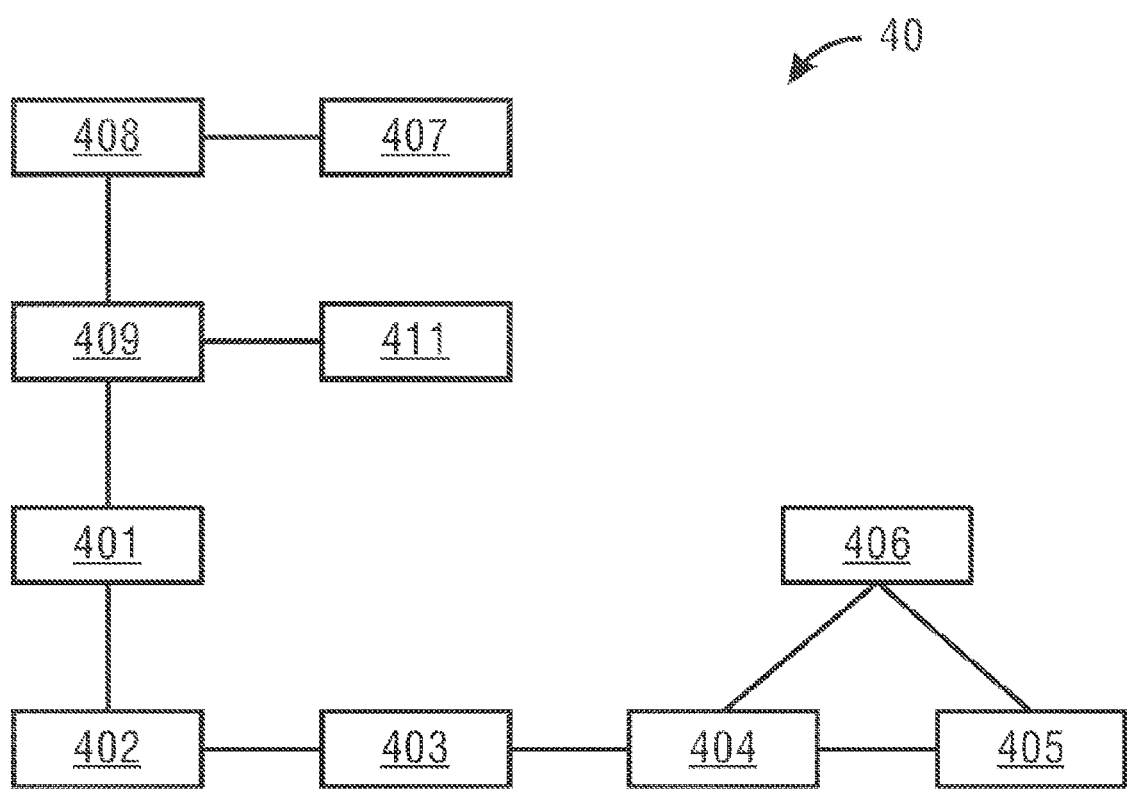
FIG. 7 is a schematic diagram of an application program development and deployment apparatus comprising a prompt message adding module incorporating teachings of the present disclosure.

In some embodiments, on the basis of the application program development and deployment apparatus 40 shown in FIG. 5, as shown in FIG. 7, the application program development and deployment apparatus 40 further comprises:

a prompt message adding module 411;

the prompt message adding module 411 is configured to, for each of the project nodes included in the first code template, before the template generating module 409 stores the first code template in the code template library, add a prompt message matching the project node in the first code template, wherein the prompt message is used to show at least one of a rule, a method, and precautions for filling the custom code into the matched project node.

Figure 8:
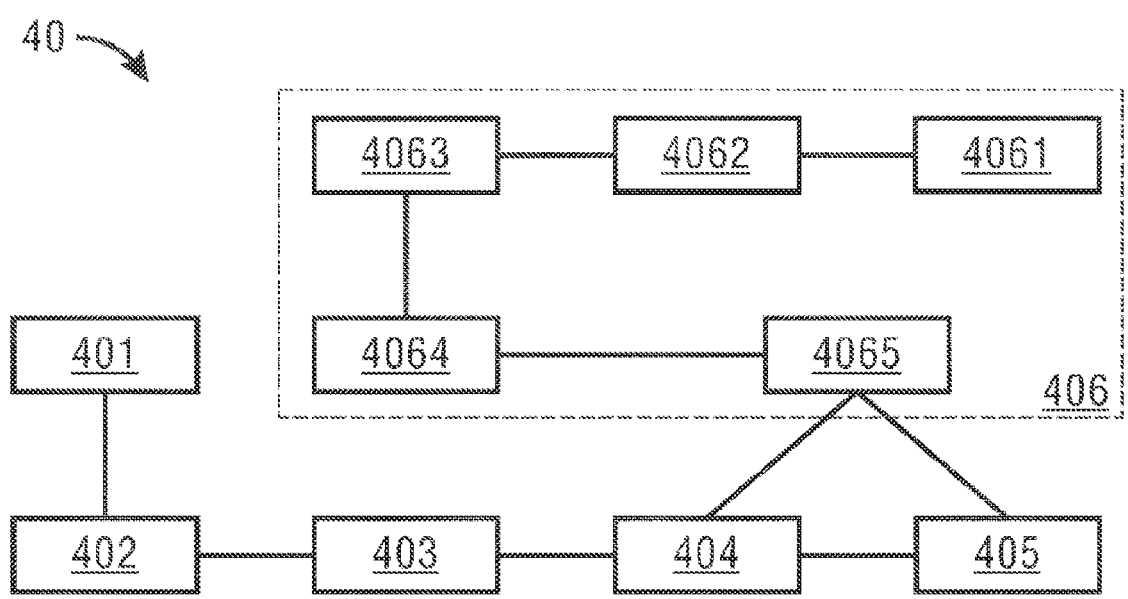
FIG. 8 is a schematic diagram of still another application program development and deployment apparatus incorporating teachings of the present disclosure.

In some embodiments, on the basis of the application program development and deployment apparatus 40 shown in FIG. 4, as shown in FIG. 8, the program deploying module 406 comprises:

a cloud platform selecting unit 4061 configured to select a target cloud platform from at least one optional cloud platform;

a signal sending unit 4062 configured to send a performance detection signal to the target cloud platform selected by the cloud platform selecting unit 4061, wherein the performance detection signal is used to cause the target cloud platform to return a resource response message used for characterizing the computing performance of the target cloud platform;

a message receiving unit 4063 configured to receive a resource response message returned by the target cloud platform according to a performance detection signal sent by the signal sending unit 4062;

a file generating unit 4064 configured to generate a deployment configuration file according to a resource response message received by the message receiving unit 4063, wherein the deployment configuration file comprises random access memory storage space and hard disk storage space required for the target program code to run; and a file sending unit 4065 configured to send the target program code, the target operating environment mirror, and the deployment configuration file generated by the file generating unit 4064 to a target cloud platform, so that the cloud platform deploys the target program code and the target operating environment mirror according to the deployment configuration file.

In some embodiments, the cloud platform selecting unit 4061 may be configured to execute step 301 in the above-described method embodiments, the signal sending unit 4062 may be configured to execute step 302 in the above-described method embodiments, the message receiving unit 4063 may be configured to execute step 303 in the above-described method embodiments, the file generating unit 4064 may be configured to execute step 304 in the above-described method embodiments, and the file sending unit 4065 may be configured to execute step 305 in the above-described method embodiments.

Figure 9:
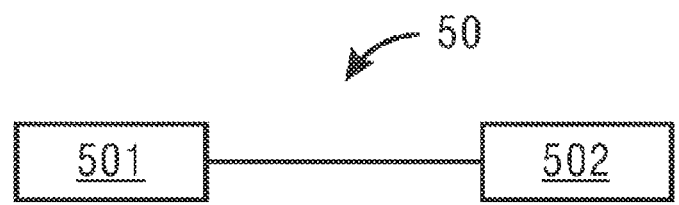
FIG. 9 is a schematic diagram of another application program development and deployment apparatus incorporating teachings of the present disclosure.

As shown in FIG. 9, an embodiment incorporating teachings of the present invention may include an application program development and deployment apparatus 50, comprising:

at least one memory 501 and at least one processor 502;

the at least one memory 501 being configured to store a machine-readable program;

the at least one processor 502 being configured to invoke the machine-readable program to implement an application program development and deployment method provided by any of the above-described embodiments.

The present disclosure further includes a computer-readable medium storing an instruction for causing a computer to execute any of the application program development and deployment methods as described herein. Specifically, it is possible to provide a system or apparatus equipped with a storage medium on which software program code for implementing functions of any of the above-described embodiments is stored, and to cause a computer (or a CPU or an MPU) of the system or apparatus to read and execute the program code stored on the storage medium.

In some embodiments, the program code itself read from the storage medium can fulfill the functions of any of the above-described embodiments and, therefore, program code and the storage medium storing the program code. Examples of storage media for providing program code include floppy disks, hard disks, magneto-optical disks, optical disks (such as CD-ROMs, CD-Rs, CD-RWs, DVD-ROMs, DVD-RAMS, DVD-RWs, and DVD+RWs), magnetic tapes, non-volatile memory cards, and ROMs. Optionally, program code may be downloaded from a server computer via a communications network.

In addition, it should be made clear that functions of any one the above-described embodiments may be implemented not only by executing program code read by a computer but also by causing, according to an instruction given by program code, an operating system, etc. running on a computer to complete part or all of actual operations.

In addition, it is understandable that functions of any of the above-described embodiments may be implemented by writing program code read from a storage medium to a memory disposed in an expansion board inserted into a computer or to a memory disposed in an expansion unit connected to a computer, and then by, according to an instruction of program code, causing a CPU, etc. installed on the expansion board or expansion unit to execute part of all of actual operations.

It should be noted that not all the steps or modules in the above-described flow charts and system structural diagrams are required, and certain steps or modules may be omitted as needed. The sequence of performing steps is not fixed and may be adjusted as needed. The system structures described in the above embodiments may be physical structures or logical structures, which means that certain modules may be implemented as the same physical entity, or certain modules may be implemented as a plurality of physical entities separately, or certain modules may be jointly implemented by certain components in a plurality of standalone devices.

In some embodiments, a hardware unit may be implemented mechanically or electrically. For example, a hardware unit may comprise a permanently dedicated circuit or logic, for example, a special processor, an FPGA, or an ASIC, for completing corresponding operations. A hardware unit may further comprise programmable logic or circuitry (for example, a general-purpose processor or any other programmable processor), which may be temporarily configured by software to perform corresponding operations. Specific manners of implementation (mechanical systems, or dedicated permanent circuits, or temporarily configured circuits) may be determined on the basis of cost and time considerations.

While teachings of the present disclosure has been described and illustrated in detail above with reference to the drawings and specific embodiments, the scope of the present disclosure is not limited to these embodiments, and those of ordinary skill in the art, on the basis of the above-mentioned embodiments, may appreciate that more embodiments of the teachings of the present disclosure may be obtained by combining the code auditing means in the different embodiments described above and that these embodiments also fall within the protection scope of the present disclosure.

LIST OF REFERENCE NUMERALS

101: Acquire, from a code template library, a first code template matching a code structure of an application program to be developed.

102: Create a template instance according to the first code template.

103: Fill a custom code into the template instance to obtain a source program code matching the application program to be developed.
104: Compile the source program code to obtain a target program code.
105: Acquire a target operating environment mirror matching the target program code from an environment mirror library.
106: Deploy the target program code and the target operating environment mirror to a target cloud platform.
201: Acquire a second code template selected by a developer.
202: Determine the project nodes included in the second code template, the attributes of the project nodes, and the node relationships among the project nodes.
203: Judge whether the number, attributes and node relationships of the project nodes match a code structure of the application program to be developed.
204: Determine the second code template as the first code template.
205: Update the structure of the second code template according to a template setting instruction to obtain the first code template.
206: Store the first code template in a code template library.
301: Select a target cloud platform from at least one optional cloud platform.
302: Send a performance detection signal to the target cloud platform.
303: Receive a resource response message from the target cloud platform.
304: Generate a deployment configuration file according to the resource response message.
305: Send the target program code, target operating environment mirror and deployment configuration file to the target cloud platform.

| 40: Application program development and deployment apparatus | 50: Application program development and deployment apparatus | 401: Template acquiring module |
| 402: Instance creating module | 403: Code filling module | 404: Code compiling module |
| 405: Environment acquiring module | 406: Program deploying module | 407: Structure identifying module |
| 408: Template matching module | 409: Template generating module | 410: Code segment adding module |
| 411: Prompt message adding module | 501: Memory | 502: Controller |
| 4061: Cloud platform selecting unit | 4062: Signal sending unit | 4063: Message receiving unit |
| 4064: File generating unit | 4065: File sending unit | |

What is claimed is:

1. An application program development and deployment method comprising:
  acquiring, from a code template library, a first code template matching a code structure of an application program to be developed, wherein at least one code template is stored in the code template library, and different code templates have different code structures;
  creating a template instance based on the first code template;
  filling a custom code input by a developer into the template instance to obtain a source program code matching said application program;
  compiling the source program code to obtain a target program code;
  acquiring a target operating environment mirror matching the target program code from an environment mirror library, wherein at least one operating environment mirror is stored in the environment mirror library, and different operating environment mirrors correspond to different operating environments; and
  deploying the target program code and the target operating environment mirror onto a target cloud platform, wherein deploying the target program code and the target operating environment mirror onto a target cloud platform comprises:
    selecting the target cloud platform from at least one optional cloud platform;
    sending a performance detection signal to the target cloud platform, wherein the performance detection signal is used to cause the target cloud platform to return a resource response message used for characterizing the computing performance of the target cloud platform;
    receiving the resource response message from the target cloud platform;
    generating a deployment configuration file according to the resource response message, wherein the deployment configuration file comprises random access memory storage space and hard disk storage space required for the target program code to run; and
    sending the target program code, the target operating environment mirror, and the deployment configuration file to the target cloud platform, so that the cloud platform deploys the target program code and the target operating environment mirror according to the deployment configuration file.

2. The method as claimed in claim 1, wherein before acquiring a first code template matching an application program to be developed, the method further comprises:
  acquiring a second code template selected by the developer;
  identifying the structure of the second code template to determine at least one project node included in the second code template, attributes of each of the project nodes, and node relationships among the different project nodes, wherein the project node is the basic unit that composes an application program code; and
  judging whether the number of the project nodes, the attributes of the project nodes and the node relationships all match a code structure of the application program to be developed;
  if the number of the project nodes, the attributes of the project nodes, and the node relationships all match a code structure of the application program to be developed, determining the second code template as the first code template, and storing the first code template in the code template library; and
  if any of the number of the project nodes, the attributes of the project nodes, and the node relationships fails to match a code structure of the application program to be developed, updating the structure of the second code template according to a template setting instruction from the developer, determining the second code template subjected to the structure update as the first code template, and storing the first code template in the code template library.

3. The method as claimed in claim 2, wherein before storing the first code template in the code template library, the method further comprises:
  for any of the project nodes included in the first code template, adding at least one code segment matching the project node to the first code template, wherein the code segment comprises the program code of at least one code character, and, after the code segment is filled into the matched project node, the project node may be caused to fulfill the corresponding function;

said filling a custom code inputted by a developer into the template instance comprises for any of the instantiated project nodes in the template instance, selecting, according to a code segment selection instruction from the developer, at least one of the code segments that match the project node and then filling it into the project node.

4. The method as claimed in claim 2, wherein before storing the first code template in the code template library, the method further comprises for each of the project nodes included in the first code template, adding a prompt message matching the project node in the first code template, wherein the prompt message is used to show at least one of a rule, a method, and precautions for filling the custom code into the matched project node.

5. An application program development and deployment apparatus comprising:
   a template acquiring module configured to acquire, from a code template library, a first code template matching a code structure of an application program to be developed, wherein at least one code template is stored in the code template library, and different code templates have different code structures;
   an instance creating module configured to create a template instance according to the first code template acquired by the template acquiring module;
   a code filling module configured to fill a custom code inputted by a developer into the template instance created by the instance creating module, to obtain a source program code matching said application program;
   a code compiling module configured to compile the source program code acquired by the code filling module, to obtain a target program code;
   an environment acquiring module configured to acquire, from an environment mirror library, a target operating environment mirror matching the target program code acquired by the code compiling module, wherein at least one operating environment mirror is stored in the environment mirror library, and different operating environment mirrors correspond to different operating environments; and
   a program deploying module configured to deploy the target program code acquired by the code compiling module and the target operating environment mirror acquired by the environment acquiring module onto a target cloud platform, wherein the program deploying module comprises:
      a cloud platform selecting unit configured to select the target cloud platform;
      a signal sending unit configured to send a performance detection signal to the target cloud platform selected by the cloud platform selecting unit, wherein the performance detection signal is used to cause the target cloud platform to return a resource response message used for characterizing the computing performance of the target cloud platform;
      a message receiving unit configured to receive the resource response message returned by the target cloud platform according to the performance detection signal sent by the signal sending unit;
      a file generating unit configured to generate a deployment configuration file according to the resource response message received by the message receiving unit, wherein the deployment configuration file comprises random access memory storage space and hard disk storage space required for the target program code to run; and
      a file sending unit configured to send the target program code, the target operating environment mirror, and the deployment configuration file generated by the file generating unit to the target cloud platform, so that the cloud platform deploys the target program code and the target operating environment mirror according to the deployment configuration file.

6. The application program development and deployment apparatus as claimed in claim 5, further comprising:
   a structure identifying module configured to obtain a second code template selected by the developer, and identify the structure of the second code template to determine at least one project node included in the second code template, attributes of each of the project nodes, and node relationships among the different project nodes, wherein the project node is the basic unit that composes an application program code;
   a template matching module configured to judge whether the number of the project nodes, the attributes of the project nodes and the node relationships determined by the structure identifying module all match a code structure of the application program to be developed; and
   a template generating module configured to, when the template matching module determines that the number of the project nodes, the attributes of the project nodes and the node relationships all match a code structure of the application program to be developed, determine the second code template as the first code template and store the first code template in the code template library, and, when the template matching module determines that any of the number of the project nodes, the attributes of the project nodes, and the node relationships fails to match a code structure of the application program to be developed, update the structure of the second code template according to a template setting instruction from the developer, determine the second code template subjected to the structure update as the first code template, and store the first code template in the code template library.

7. The application program development and deployment apparatus as claimed in claim 6, further comprising a code segment adding module configured to, before the template generating module stores the first code template in the code template library, for any of the project nodes included in the first code template, add at least one code segment matching the project node to the first code template, wherein the code segment is a program code containing at least one code character, and, after the code segment is filled into the matched project node, the project node may be caused to fulfill the corresponding function;
   wherein the code filling module is configured to, for any of the instantiated project nodes in the template instance, select, according to a code segment selection instruction from the developer, at least one of the code segments added by the code segment adding module that match the project node and then fill it into the project node.

8. The application program development and deployment apparatus as claimed in claim 6, further comprising a prompt message adding module;

wherein the prompt message adding module is configured to, for each of the project nodes included in the first code template, before the template generating module stores the first code template in the code template library, add a prompt message matching the project node in the first code template, wherein the prompt message is used to show at least one of a rule, a method, and precautions for filling the custom code into the matched project node.

9. An application program development and deployment apparatus comprising:

a memory; and a processor;

the memory storing a machine-readable program;

the processor configured to invoke the machine-readable program to implement a method comprising:

acquiring, from a code template library, a first code template matching a code structure of an application program to be developed, wherein at least one code template is stored in the code template library, and different code templates have different code structures;

creating a template instance based on the first code template;

filling a custom code input by a developer into the template instance to obtain a source program code matching said application program;

compiling the source program code to obtain a target program code;

acquiring a target operating environment mirror matching the target program code from an environment mirror library, wherein at least one operating environment mirror is stored in the environment mirror library, and different operating environment mirrors correspond to different operating environments; and deploying the target program code and the target operating environment mirror onto a target cloud platform, wherein deploying the target program code and the target operating environment mirror onto a target cloud platform comprises:

selecting the target cloud platform from at least one optional cloud platform;

sending a performance detection signal to the target cloud platform, wherein the performance detection signal is used to cause the target cloud platform to return a resource response message used for characterizing the computing performance of the target cloud platform;

receiving the resource response message from the target cloud platform;

generating a deployment configuration file according to the resource response message, wherein the deployment configuration file comprises random access memory storage space and hard disk storage space required for the target program code to run; and sending the target program code, the target operating environment mirror, and the deployment configuration file to the target cloud platform, so that the cloud platform deploys the target program code and the target operating environment mirror according to the deployment configuration file.

* * * * *